(12) United States Patent
Frisken

(10) Patent No.: US 9,236,940 B2
(45) Date of Patent: *Jan. 12, 2016

(54) HIGH BANDWIDTH DEMODULATOR SYSTEM AND METHOD

(71) Applicant: Finisar Corporation, Horsham, PA (US)

(72) Inventor: Steven James Frisken, Vaucluse (AU)

(73) Assignee: Finisar Corporation, Horsham, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/955,351

(22) Filed: Jul. 31, 2013

(65) Prior Publication Data

US 2014/0064725 A1    Mar. 6, 2014

Related U.S. Application Data

(63) Continuation of application No. 12/842,333, filed on Jul. 23, 2010, now Pat. No. 8,526,830.

(60) Provisional application No. 61/228,940, filed on Jul. 27, 2009, provisional application No. 61/322,076, filed on Apr. 8, 2010.

(51) Int. Cl.
  *H04B 10/61* (2013.01)
  *H04B 10/079* (2013.01)
  *H04B 10/60* (2013.01)

(52) U.S. Cl.
  CPC .......... *H04B 10/07955* (2013.01); *H04B 10/60* (2013.01); *H04B 10/614* (2013.01)

(58) Field of Classification Search
  CPC ..................................................... H04B 10/614
  USPC .................. 398/152, 202, 203, 208
  See application file for complete search history.

(56) References Cited

U.S. PATENT DOCUMENTS

| | | |
|---|---|---|
| 5,473,463 A | 12/1995 | Van Deventer |
| 6,327,019 B1 | 12/2001 | Patel et al. |
| 6,917,031 B1 | 7/2005 | Sun et al. |

(Continued)

FOREIGN PATENT DOCUMENTS

| | | |
|---|---|---|
| WO | 03/032071 A1 | 4/2003 |
| WO | 2004/005993 A1 | 1/2004 |

OTHER PUBLICATIONS

"Supplementary Search Report" for EP 05749258.9-2217/1766819, Jan. 21, 2013, European Patent Office, Munich, Germany.
Li, Guifang, Recent Advanced in Coherent Optical Communication, Advanceds in Optics and Photonics I, 2009, pp. 279-307.

*Primary Examiner* — Nathan Curs
(74) *Attorney, Agent, or Firm* — Kurt Rauschenbach; Rauschenbach Patent Law Group, LLC

(57) ABSTRACT

A method of analyzing an input signal, the method including the steps of: (a) dividing a first input signal into first and second orthogonal signal polarization components; (b) dividing a second input signal into orthogonal first and second orthogonal local polarization components; (c) mixing the first orthogonal signal component with the second orthogonal local polarization component to provide a first mixed signal; (d) mixing the second orthogonal signal component with the first orthogonal local polarization component to provide a second mixed signal; (e) analyzing the first and second mixed signal to determine the polarization or phase information in the input signal.

7 Claims, 7 Drawing Sheets

(56) References Cited

U.S. PATENT DOCUMENTS

| | | |
|---|---|---|
| 7,209,670 B2 | 4/2007 | Fludger et al. |
| 7,315,575 B2 | 1/2008 | Sun et al. |
| 7,483,641 B1 * | 1/2009 | Mak .............................. 398/204 |
| 2002/0131691 A1 | 9/2002 | Garrett et al. |
| 2007/0223932 A1 | 9/2007 | Hsieh |
| 2010/0074632 A1 * | 3/2010 | Zhou .............................. 398/208 |
| 2010/0086303 A1 * | 4/2010 | Qian et al. ....................... 398/65 |

* cited by examiner

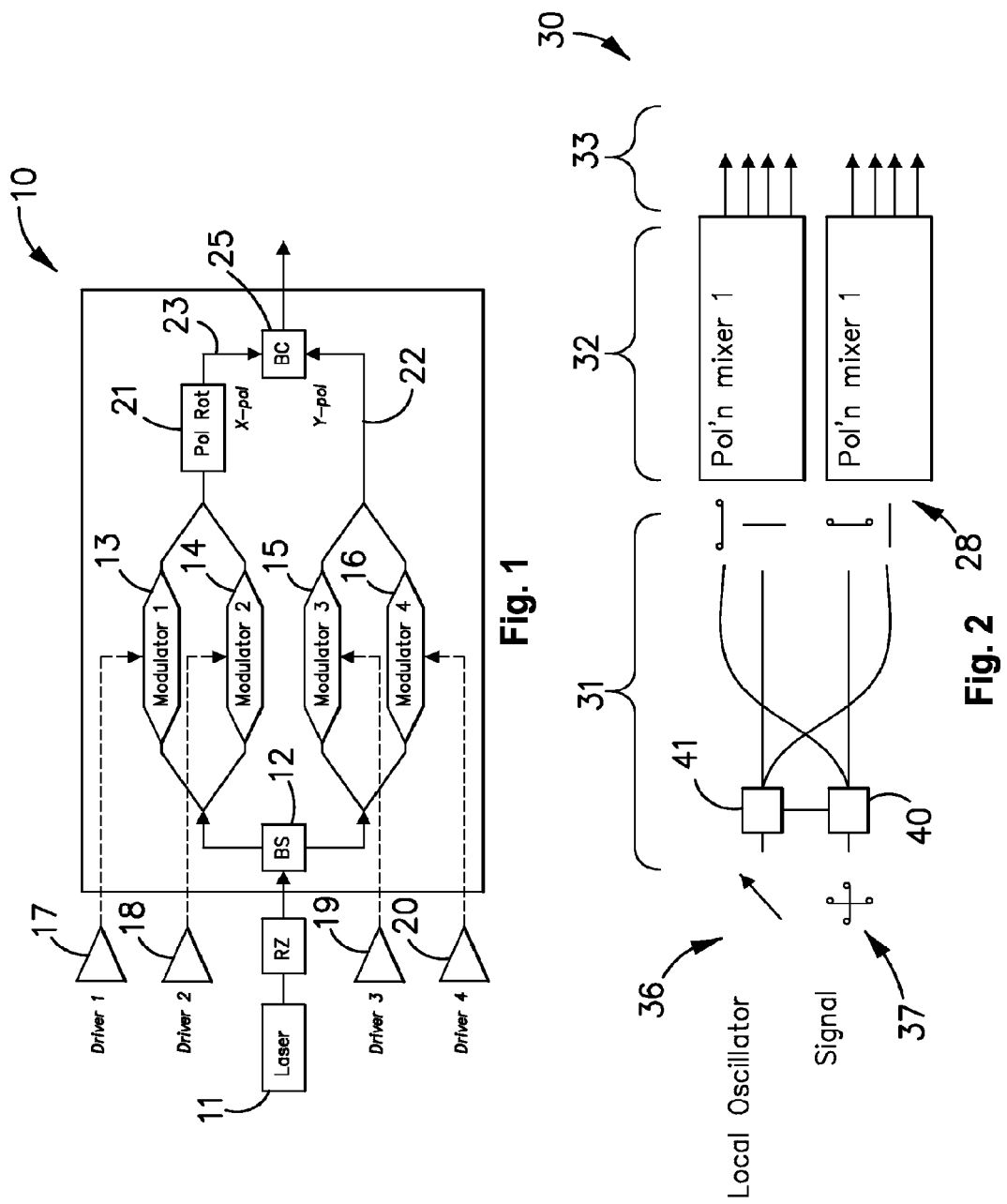

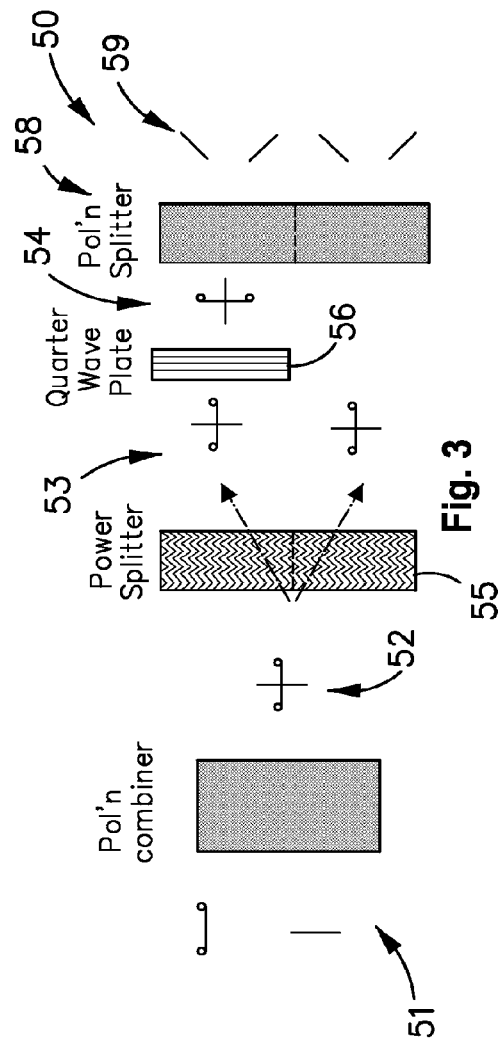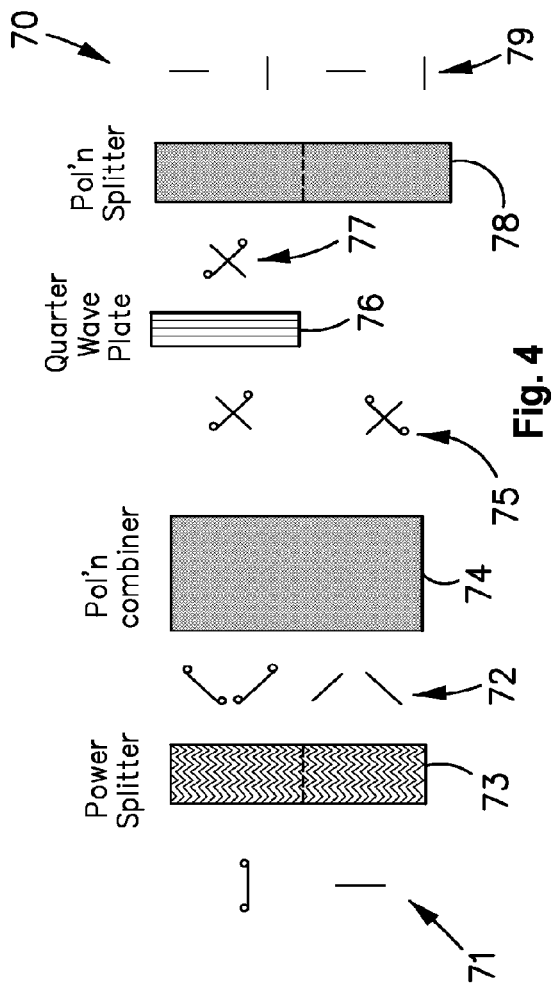

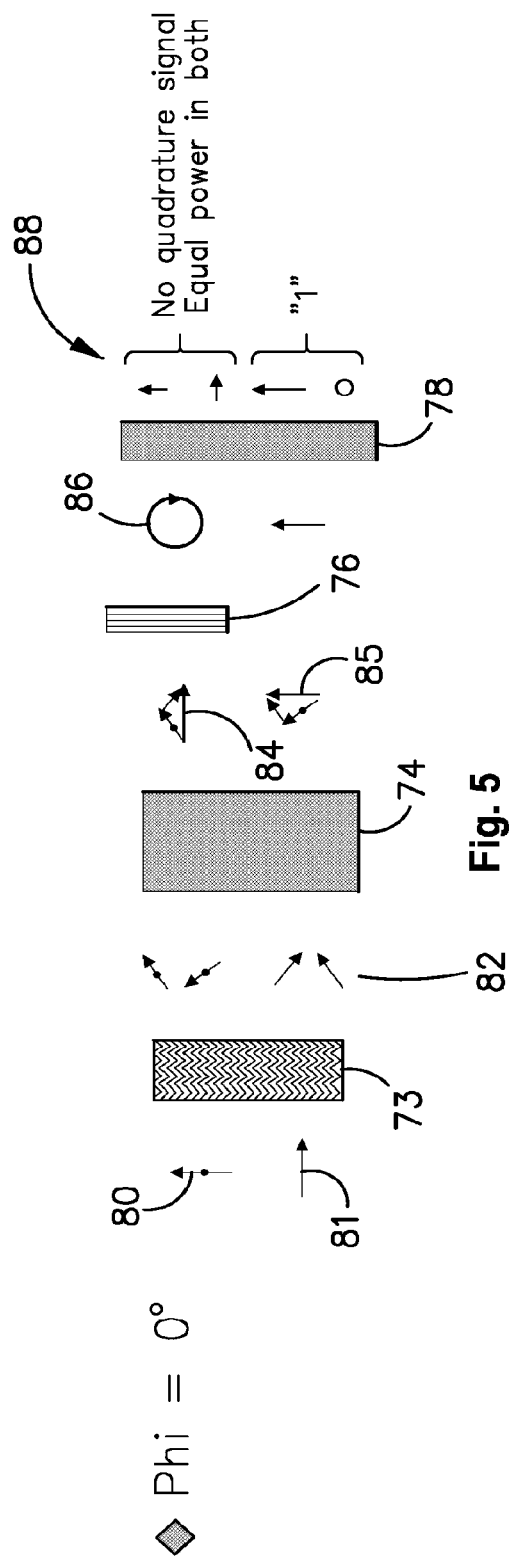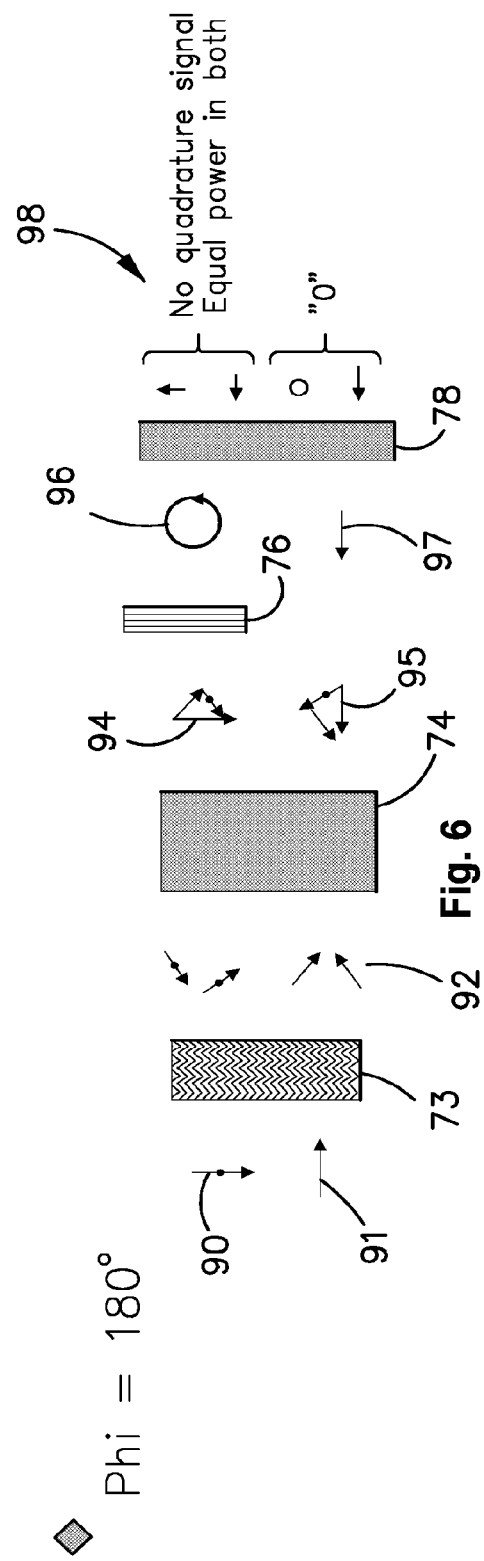

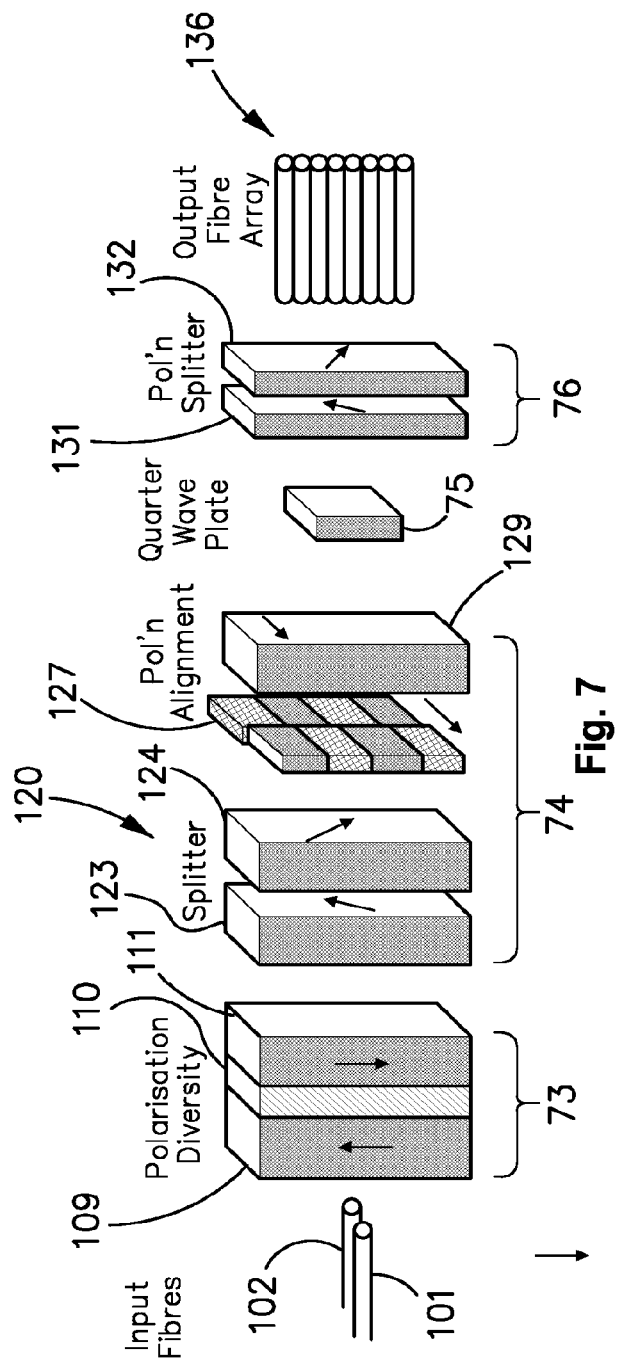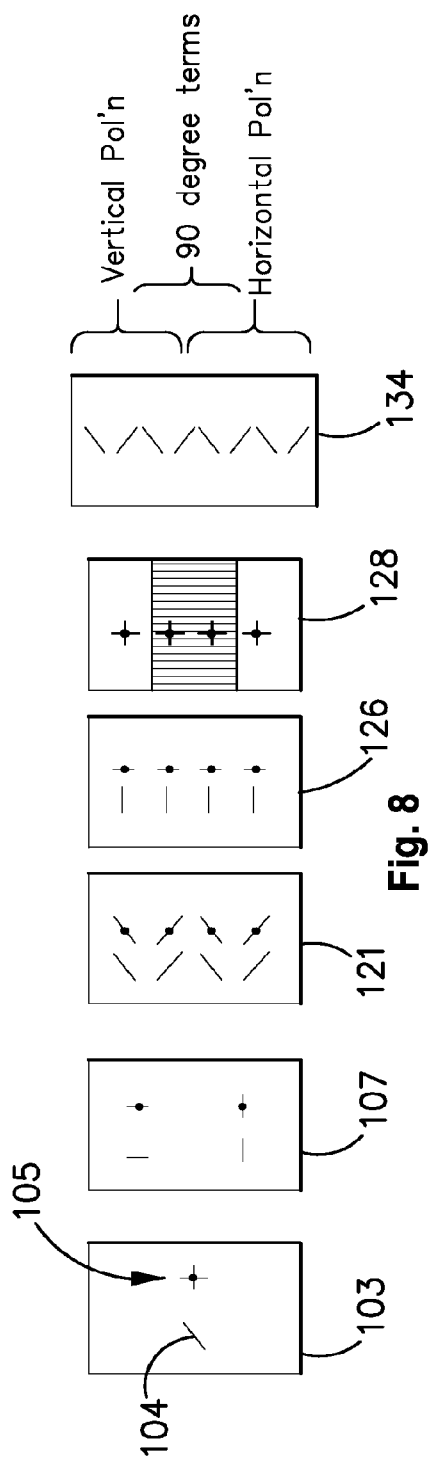

HIGH BANDWIDTH DEMODULATOR SYSTEM AND METHOD

CROSS REFERENCE TO RELATED APPLICATIONS

This patent application is a continuation of U.S. patent Ser. No. 12/842,333, filed on Jul. 23, 2010, entitled "High Bandwidth Demodulator System and Method" which claims priority to U.S. Provisional Patent Application Ser. No. 61/322,076, filed on Apr. 8, 2010, entitled "High Bandwidth Demodulator System and Method" and to U.S. Provisional Patent Application Ser. No. 61/228,940, filed on Jul. 27, 2009, entitled "High Bandwidth Demodulator System and Method," the entire disclosures of these patent applications are incorporated herein by reference.

FIELD OF THE INVENTION

The present invention relates to the analysis of optical signals in general. In one application the invention relates to high capacity optical demodulation and, in particular, discloses a high capacity optical system and method for demodulation of the electric field vector (phase and amplitude) for a given pair of polarization states.

BACKGROUND OF THE INVENTION

Demand for the accurate analysis of optical signals continues to be of significant importance in many fields. For example, in accurate measurement, it is often important to be able to accurately sample an optical signal. The need for accurate measurement is prevalent in a wide range of fields, including optical telecommunications and optical measurement.

For example, demand for high capacity data transmission continues to grow and grow. One dominant form of transmission is optical transmission over optical fibers or the like or optical free space transmission. Current planning demands future 100 gigabytes per second (100G) systems. With such high capacity transmission systems, there is a need to demodulate a received optical signal.

One suitable encoding methodology for high bandwidth optical transmission is Differential Quaternary Phase-Shift Keying (DQPSK). In such a system, information is encoded in the phase of the transmitted signal. In particular, encoding is provided in phase changes in the transmitted signal.

One high capacity DQPSK transmission system for optical communications is Dual Polarization with Quadrature Phase Shift Keying. Example DP-QPSK systems are set out in the following:

U.S. Pat. No. 5,473,463 to Van Deventer discloses an optical receiver known as an optical hybrid device;

U.S. Patent application publication number 2007/0223932 to Hsieh also discloses a coherent optical receiver device.

"Recent advances in coherent optical communication" by Guifang Li, Advances in Optics and Photonics 1, 279-307 (2009) discusses the principals of coherent optical receivers.

Other optical hybrid devices are discloses in U.S. Pat. No. 7,209,670 to Fludgerfl, U.S. Pat. No. 7,315,575 to Sunfl, U.S. Pat. No. 6,917,031 to Sunfl.

Normally, in each of the above referenced designs, it is common to implement detection coherently by means of mixing of the electric field vectors of the aligned polarization states of an input signal and a local oscillator. A number of problems are provided with implementation of such designs.

The aforementioned arrangements often rely upon interferometric structures with one arm of the interferometer providing a 90 degree phase delay. Unfortunately, the requirement for a 90 degree phase delay can often lead to difficulty in meeting tolerances. A 90 degree phase shift is equivalent to, at standard optical transmission bands, to the utilization of a 400 nanometer optical element. Allowing for say a 2 to 3 degree tolerance accuracy places about a 10 nanometer tolerance accuracy on the phased delayed element. This is difficult to provide, especially where temperature variations occur. Further, the interferometric system often leads to extremely tight tolerances on alignment. This normally leads to a high expense in manufacturing optical hybrid devices or the additional complexity of actively tuning the phase delay based upon a feedback from the signal.

As phase and amplitude detection techniques are highly likely to be utilized in 100 gigabit transmission systems (100G), there is a general need for an effective form of polarization processing of transmitted signals so as to provide for electric field phase and amplitude detection and decoding. The utilization of polarization multiplexed phase encoding in 100G coherent systems allows for higher data rates of transmission. Detection of the electric field vector of the optically transmitted signal is particularly advantageous as it permits the calculation and mitigation of many transmission impairments and distortions such as chromatic dispersion induced pulse spreading and polarization mode dispersion.

The coherent transmission system is likely to rely on a dual polarization with a quadrature phase shift key modulation scheme (DP-QPSK). This is known to be especially efficient and provides improved signal to noise and allows for utilization of CMOS electronic decoder systems. Other forms of optical encoding are known and are also applicable with the present invention.

Turning initially to FIG. 1, there is illustrated one form of reference design 10 for a DP-QPSK transmitter. The reference design illustrates transmission on one wavelength band only. It will be obvious to those skilled in the art that it can be combined via multiplexing with other transmitters for other wavelength bands. In the DP-QPSK transmission system, an input laser 11 of predefined frequency and polarization state is input 12 and is interconnected to a number of modulators 13-16 which act under electronic control of drivers 17-20. The modulators 13-16 act to phase modulate the signal in a known controlled manner.

The modulators act to phase encode an input data stream. Polarization multiplexing is then provided by polarization rotation element 21 which outputs an orthogonal polarization 23 to second polarization 22. The two orthogonal polarizations are combined 25 by beam combiner for transmission.

The signal is then transmitted in a particular wave length band. During transmission, the orthogonality of the polarization states is substantially maintained although rotation of the overall polarization state may occur.

The receiver is then responsible for decoding the transmitted signal so as to extract the data information that has been encoded by the transmitter.

SUMMARY OF THE INVENTION

It is an object of the present invention provide for an improved form of analysis of optical signals, particularly phase encoded or polarization multiplexed optical signals.

In accordance with a first aspect of the present invention, there is provided a method of analysing an input signal, the method including the steps of: (a) dividing a first input signal into first and second orthogonal signal polarisation components; (b) dividing a second input signal into orthogonal first and second orthogonal local polarisation components; (c) mixing the first orthogonal signal component with the second orthogonal local polarisation component to provide a first mixed signal; (d) mixing the second orthogonal signal component with the first orthogonal local polarisation component to provide a second mixed signal; (e) analysing the first and second mixed signal to determine the polarisation and/or phase information in the input signal.

In some embodiments, the second input signal can comprise a time delayed version of the first input signal. In some embodiments, the input signal preferably can include information encoded in a periodic signal and the time delay can comprise substantially one signal period. In some embodiments, the encoding can be DP-QPSK encoding. In other embodiments, the second input signal can comprise a local oscillatory signal having a predetermined polarisation.

In accordance with a further aspect of the present invention, there is provided a method of analysing an input signal, the method including the steps of: (a) dividing the input signal into first and second orthogonal signal polarisation components; (b) dividing a local oscillatory signal having a predetermined polarisation into orthogonal first and second orthogonal local polarisation components; (c) mixing the first orthogonal signal component with the second orthogonal local polarisation component to provide a first mixed signal; (d) mixing the second orthogonal signal component with the first orthogonal local polarisation component to provide a second mixed signal; (e) analysing the first and second mixed signal to determine the polarization and/or phase information in the input signal.

The step (e) further preferably can include the steps of: (e1) splitting the power of the first mixed signal into at least a first and second mixed sub-signals; (e2) delaying one orthogonal polarisation component of the first sub-signal relative to the second component by $\pi/2$ radians to produce a phase delayed first sub-signal; (e3) dividing the phase delayed first sub signal into orthogonal components and the second mixed sub-signal into orthogonal components.

The step (e) further preferably can include the steps of: (e1) delaying one orthogonal polarisation component of the first sub-signal relative to the second component by $\pi/2$ radians to produce a phase delayed first sub-signal; (e2) dividing the phase delayed first sub signal into orthogonal components and the second mixed sub-signal into orthogonal components.

In accordance with a further aspect of the present invention, there is provided an apparatus for analysis of the polarisation state of an input signal, the apparatus including: a polarisation diversity element interconnected to the input signal and local oscillating signal for separating orthogonal components of the input signal and a predetermined second optical signal into first and second orthogonal signal components; a first polarisation splitting element for further splitting the first and second orthogonal signal components into further orthogonal subcomponents, and first and second orthogonal second optical signal components into further orthogonal subcomponents; a polarisation element for polarisation aligning predetermined ones of the sub-components; a polarisation translation element for spatially aligning groups of polarisation aligned sub-components to produce a series of spatially aligned subcomponents; a second polarisation splitting element for splitting the aligned subcomponents into output components.

In accordance with a further aspect of the present invention, there is provided an apparatus for decoding polarization encoded input signals, the apparatus including: a local oscillator outputting a local oscillating signal having a predetermined polarization state; an input for inputting the polarization encoded input signal; a polarisation diversity element interconnected to the input signal and local oscillating signal for separating orthogonal components of each into first and second orthogonal signal polarisation components and the local oscillating signal into first and second orthogonal local signal components; a first polarisation splitting element for further splitting the first and second orthogonal signal components into further orthogonal subcomponents, and first and second orthogonal local signal components into further orthogonal subcomponents; a polarisation element for polarisation aligning predetermined ones of the sub-components; a polarisation translation element for spatially aligning groups of polarisation aligned sub-components to produce a series of spatially aligned subcomponents; a second polarisation splitting element for splitting the aligned subcomponents into output components.

In accordance with a further aspect of the present invention, there is provided an apparatus for analysis polarization and/or phase encoded input signals, the apparatus including: an input for inputting the polarization encoded input signal; a delay element for producing a delayed version of the input signal; a polarisation diversity element interconnected to the input signal and the delayed version of the input signal for separating orthogonal components of each into first and second orthogonal signal polarisation components and the delayed version of the input signal into first and second orthogonal delayed signal components; a first polarisation splitting element for further splitting the first and second orthogonal signal components into further orthogonal subcomponents, and first and second orthogonal delayed signal components into further orthogonal subcomponents; a polarisation element for polarisation aligning predetermined ones of the sub-components; a polarisation translation or deflection element for spatially aligning groups of orthogonal polarisation aligned sub-components to produce a series of spatially aligned subcomponents; a second polarisation splitting element for splitting the aligned subcomponents into output components.

In accordance with a further aspect of the present invention, there is provided a method of measuring polarization and/or phase information present in an input signal, the method including the steps of: (a) dividing a first input signal into first and second orthogonal signal polarisation components; (b) dividing a second input signal into orthogonal first and second orthogonal second signal polarisation components; (c) mixing the first input signal with the first and second orthogonal second signal polarisation components to provide first and second mixed signals; and (d) analysing the first and second mixed signal to determine the polarisation information in the input signal.

In accordance with a further aspect of the present invention, there is provided a method of measuring polarization information present in an input signal, the method including the steps of: (a) dividing the input signal into first and second orthogonal signal polarisation components; (b) dividing a local oscillatory signal having a predetermined polarisation into orthogonal first and second orthogonal local polarisation components; (c) mixing the input signal with the first local polarisation component and the second orthogonal local polarisation component to provide first and second mixed signals; and (d) analysing the first and second mixed signal to determine the polarisation information in the input signal.

In accordance with a further aspect of the present invention, there is provided a method of measuring polarization information present in an input signal, the method including the steps of: (a) dividing a local oscillatory signal having a predetermined polarisation into orthogonal first and second orthogonal local polarisation components; (c) mixing the input signal with the first local polarisation component and the second orthogonal local polarisation component to provide first and second mixed signals; and (d) analysing the first and second mixed signal to determine the polarisation information in the input signal.

BRIEF DESCRIPTION OF THE DRAWINGS

Benefits and advantages of the present invention will become apparent to those skilled in the art to which this invention relates from the subsequent description of exemplary embodiments and the appended claims, taken in conjunction with the accompanying drawings, in which:

FIG. 1 illustrates schematically a standard proposed transmitter structure for DP-QPSK networks;

FIG. 2 illustrates schematically a DP-QPSK receiver plan of a first embodiment;

FIG. 3 illustrates schematically the polarization demodulation principle utilised in the first embodiment;

FIG. 4 illustrates an alternative polarization demodulation operation;

FIG. 5 and FIG. 6 illustrate example binary phase demodulations suitable for use with the first embodiment;

FIG. 7 illustrates one form of implementation of a receiver of the first embodiment;

FIG. 8 illustrates the polarization state transitions for inputted signals in the arrangement of FIG. 7;

DESCRIPTION OF THE PREFERRED AND OTHER EMBODIMENTS

Figure 9:
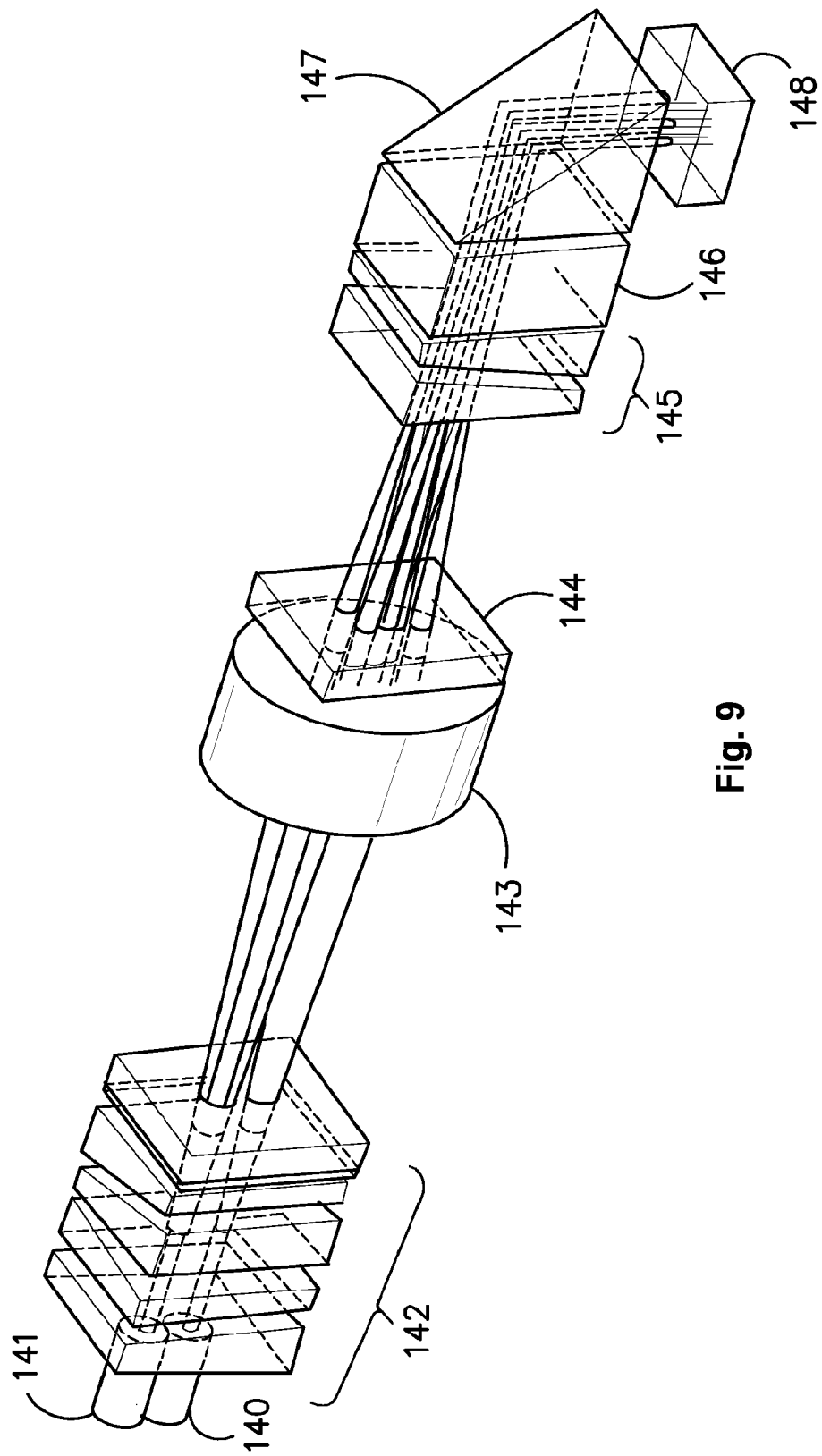
FIG. 9 illustrates a prototyping of a receiver of the first embodiment.

The preferred embodiments provide a method and apparatus for phase analysis of polarization multiplexed phase modulated signals. For example polarization independent detection and demodulation of a single polarization QPSK format can be achieved. The requirement for active polarization control and the demodulator could be used further for demodulation of single or polarization multiplexed optical OFDM (Orthogonal Frequency Division Multiplexed) systems. Alternatively, the preferred embodiment could be used in the general analysis of phase information in signals.

Turning to FIG. 2, there is illustrated schematically the general structure of a first embodiment optical processing unit 30. In this unit 30, the inputs include a local oscillator 36 having a 45 degree polarization state in addition to the input signal 37. The signal 37 is made up of orthogonal polarizations with each of the orthogonal polarizations further having a phased encoding in accordance with the DP-QPSK standard.

The first embodiment comprises three stages. The first stage 31 separates orthogonal components of the input local oscillator 36 and the input signal 37. This is achieved by utilizing a polarization splitting crystal 40, 41. Each of the polarization splitters split the polarization into vertical and horizontal components. The next stage 32 analyses each of the orthogonal polarizations by means of a polarization mixer. The polarization mixer outputs 33 can either be fiber coupled to outputs or coupled to a PIN-TIA array of detectors at a small pitch. In the arrangement 30, the polarization states upon input to the mixer stage 32 are orthogonal. The polarization mixer relies on combining orthogonal polarization states of signal and local oscillator and then analyzing the generated polarization state to generate the required signals.

Turning now to FIG. 3, there is illustrated an example of the operation of each of the polarization mixers 32 of FIG. 2. The first polarization stage takes orthogonal polarization inputs 51 and combines them 52. Then they are split 53 with the power split into upper and lower channels. In one embodiment, the splitter could be a transmission grating with periodic structure designed to provide an angular separation between positive and negative orders of the grating or could be provided by a partial mirror.

One of those channels undergoes a polarization retardation 54 by means of quarter wave plate 56. Next polarization splitter 57 splits the polarization states into diagonal orthogonal components to provide outputs 59.

An alternative arrangement of the polarization mixer is illustrated 70 in FIG. 4. In this arrangement, the power splitting process is moved before the polarization combination. The input polarizations 71 are subject to a power splitting 72 via power splitter 73. Next polarization combiner 74 combines the split power combinations to produce output 75. One of the combinations is then subject to rotation via quarter wave plate 76 so as to produce output 77. Next, polarization splitter 78 separates orthogonal polarizations to produce separated outputs 79.

A simple example explanation of operation of the mixer will now be described. For simplicity of explanation, FIG. 5 and FIG. 6 illustrate examples of polarization state transformation in the polarization mixer. These illustrations are for the case of binary phase demodulation. Taking initially FIG. 5, the case of Phi=0 degrees is illustrated, the input polarization 80 is assumed to be vertical. The mixer input 81 is in the horizontal state. The power splitter 73 splits the power of the input producing polarization outputs 82. The combiner 74 combines the two polarization states into their vector sum. In this case the two inputs are combined 'vectorially' to produce vector sums 84, 85. The quarter wave plate 76 delays one polarization axis relative to the other so that horizontal polarization state 84 is transformed into circular polarization state 86. The polarization splitter 78 then provides polarization outputs 88. In this particular instance of Phi=0, where no quadrature signal is encoded and only binary phase demodulation is implemented, equal power is initially distributed into each top channel so that no distinguishable quadrature signal is output. However, in the bottom two channels, the equivalent of a binary '1' is output with all the power from the vertical polarization state 85 going into one channel and zero power being output into the other channels.

FIG. 6 illustrates the case when Phi=180 degrees and it can be seen that similar processing occurs through the element 73, 74, 76 and 78. Initially, the polarization states 90, 91 are distributed 92 by element 73. Next, they are combined vectorially via polarization combiner 74 to produce vectorially combined polarization states 94, 95. The polarization state 94 is subject to quarter wave plate relative delay to produce elliptical/circular polarization state 96 with the polarization state 95 being unaffected 97. Finally, polarization splitter 78 acts on signal 97 to produce output signals 98. Again, in this situation no quadrature signal is provided on the upper output ports with the output power being distributed equally on both channels. However, in the lower channels, the polarization state 97 results in an output '1' in the lower channel which is interpreted as an output equivalent to binary (0).

Where quadrature encoding of the polarization signals is utilized, the top two channel outputs provide an indicator of the phase encoding of the signals.

FIG. 7 illustrates one form of implementation of the preferred embodiment in more detail. FIG. 7 needs to be ideally read in conjunction with FIG. 8 which illustrates a corresponding evolution of polarization states for the arrangement of FIG. 7. The transmitted signal and local oscillator are input on input fibers 101, 102. Referring to the polarization states, the local oscillator is input having an input polarization of 45 degrees to the vertical. The received signal has a randomly oriented polarization state 105 depending on the current transmission alignment and transmission encoding.

The polarization diversity element 73 acts to spatially separate orthogonal polarization components producing polarization outputs 107. The diversity element consists of a first walk off crystal 109, a half wave plate 110 and a second walk off crystal 111. As is known in the art, the walk off crystals 109, 111 act to spatially separate orthogonal polarization states. The walk off crystal can be a birefringent $YVO_4$ (Ytrium Vanadate) crystal with the optical axis aligned at approximately 45 degrees to the face of the crystal in the direction of the required separation of the polarization states. In this case, the first walk off crystal 109 acts to translate the horizontally polarized input in a vertical manner. The half wave plate 110 rotates both polarization states by $\pi/2$ degrees. The second walk off plate 111 thereafter translates the newly horizontal polarization state downwards. The net result of this operation, as will be evident to those skilled in the art, is to separate the horizontal and vertical components of the input signals to produce polarization outputs 107.

Next, the polarization splitter element 120 acts to power split the spatially separated signals 107 into corresponding polarization outputs 121. The splitter consists of two walk off crystals 123, 124. The crystals are oriented at +45 degrees and −45 degrees to the horizontal axis respectfully. The resulting effect of the two walk off plates is illustrated in polarization state diagram 121 which illustrates that each of the previous polarization states 107 have been rotated and divided into two components. The polarization state of each component being at +/−45 degrees to the horizontal.

Next, a half wave plate array 127 acts to align the polarization states into vertical and horizontal components 126. The walk off plate 129 translates the vertical polarization component so that it overlaps with the horizontal components as indicated 128.

The quarter wave plate 75 is placed centrally to act on the middle two channels only and acts to delays one polarization component relative to the other by $\pi/4$ radians. This provides for determining the quadrature phase terms and allows an unambiguous determination of the relative phase between the oscillator and signal via analysis of the horizontal and vertical polarization states with a 90 degrees offset in the phase.

The polarization splitter 76 comprises walk off crystals 131, 132 aligned at +/−45 degrees to the horizontal respectively. The polarization splitter 76 acts to distribute the power of the polarization states 128 for output on output fiber array 136. The outputs include vertical polarization outputs, horizontal polarization outputs and 90 degree delay terms.

The embodiment provides for a means for processing polarization and phase encoded information in an optical signal. It is not limited to fiber optical transmission. Indeed, the present invention has application wherever it is desired to decode polarization state information in an input signal.

FIG. 9 illustrates one form of simulated optical train implementing the arrangement of FIG. 2. In this arrangement, the polarization separation is achieved by wedges rather than walk off plates. In this arrangement, the local oscillator signal is input on fibre 140 with the input signals being input on fibre 141. The polarisation diversity and splitting in addition to the polarisation alignment portions are provided by optical components 142 which include a series of polarization wedges and half wave plate array. A lens 143 is also provided for focusing the input beams. The quarter wave plate 144 acts only on predetermined portions of the signal train. The polarisation combining is provided by birefringent wedges 145 and polarization analysis is provided by walk-off plates 146. The output signals are then reflected onto PiN Array 148 by prism 147.

For some modulation formats (such as ODB, DPSK and DQPSK), a logical exclusive-OR (or modulo 2 addition) is necessary in the demodulator. It is possible to implement such a function in the optical domain using an optical delay line. With an optical delay line, the incoming optical signal is split into two paths. The signal in one path is delayed by a time corresponding to one bit and the signals in the two paths are coherently re-combined.

Thus, if the optical signal and the delayed optical signal are in phase, the sum output will be comparable in magnitude with the original optical signal whereas the difference output will be approximately zero. If the signals are $\pi$ radians out of phase, the difference output will be comparable in magnitude with the original optical signal whereas the sum output will be approximately zero.

Figure 10:
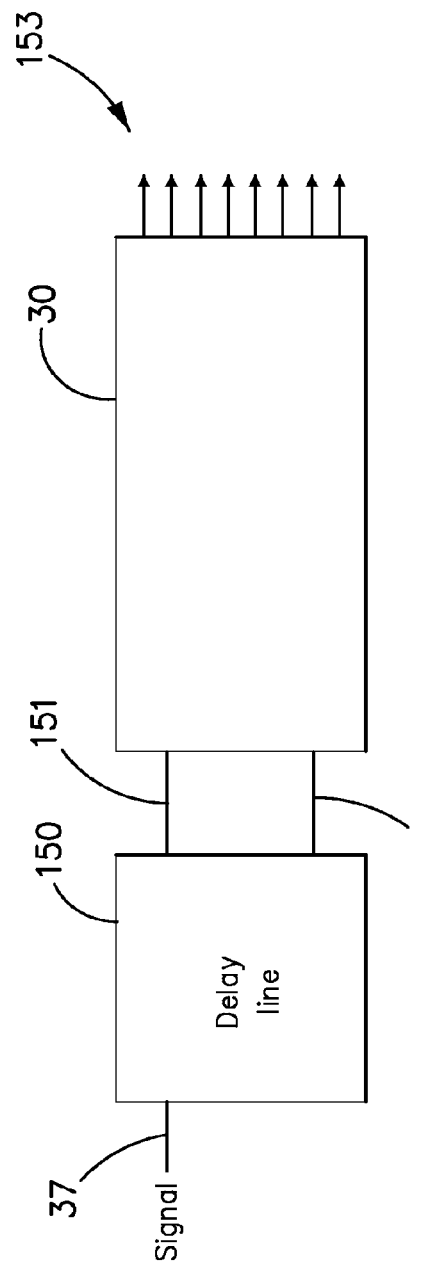
FIG. 10 illustrates schematically the operation of an alternative embodiment.

Through the utilization of an initial delay line on the front end of the first embodiment, the need for a local oscillator can be dispensed with. The resultant overall device is illustrated schematically in FIG. 10. In this arrangement, the input signal initially proceeds through an optical delay line 150 to produce signal output 151 and delayed output 152, with the delay output 152 being delayed by one period relative to the output 151.

The outputs are fed to the optical processing unit 30 which produces a series of outputs 153, in the usual manner.

Figure 11:
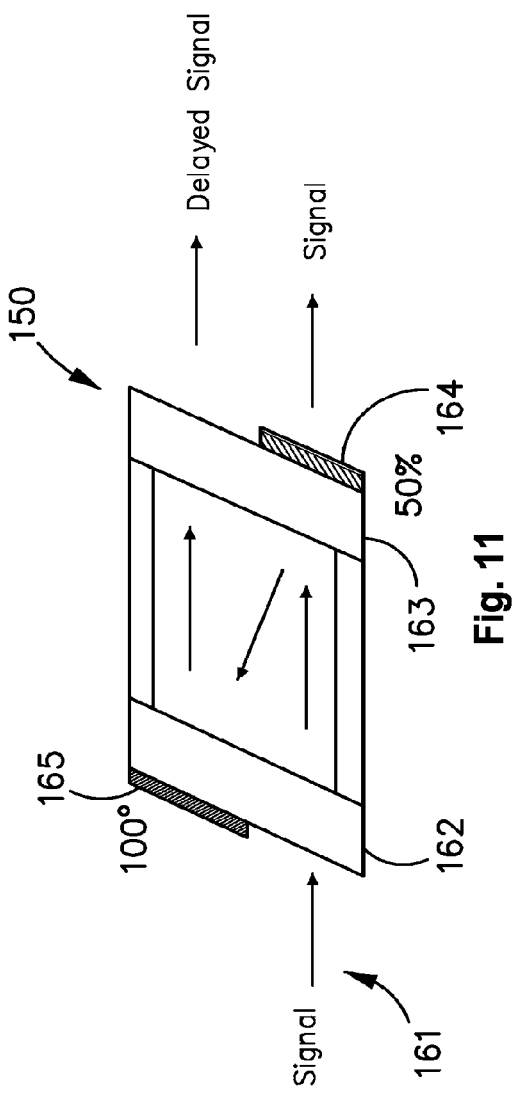
FIG. 11 illustrates one form of optical delay line.

The delay line can take many forms. One form is illustrated in FIG. 11 and provides a free space delay line 150. An input signal 161 is fed though first and second transparent plates 162, 163. The plate 163 has a 50% silvered mirror 164 on one surface thereof 50% of the light is output as the signal. The reflected light is transmitted to a second silvered mirror 165 which provides for 100% reflection. The further reflected light is then output as the delayed signal. The distance the delayed signal has to travel is constructed to be equivalent to the optical period of the input signal. The delay line 150 is preferably constructed from materials having a low coefficient of thermal expansion and operated in a stable temperature environment so that the delay path length variation is minimized in the presence of temperature changes.

Figure 12:
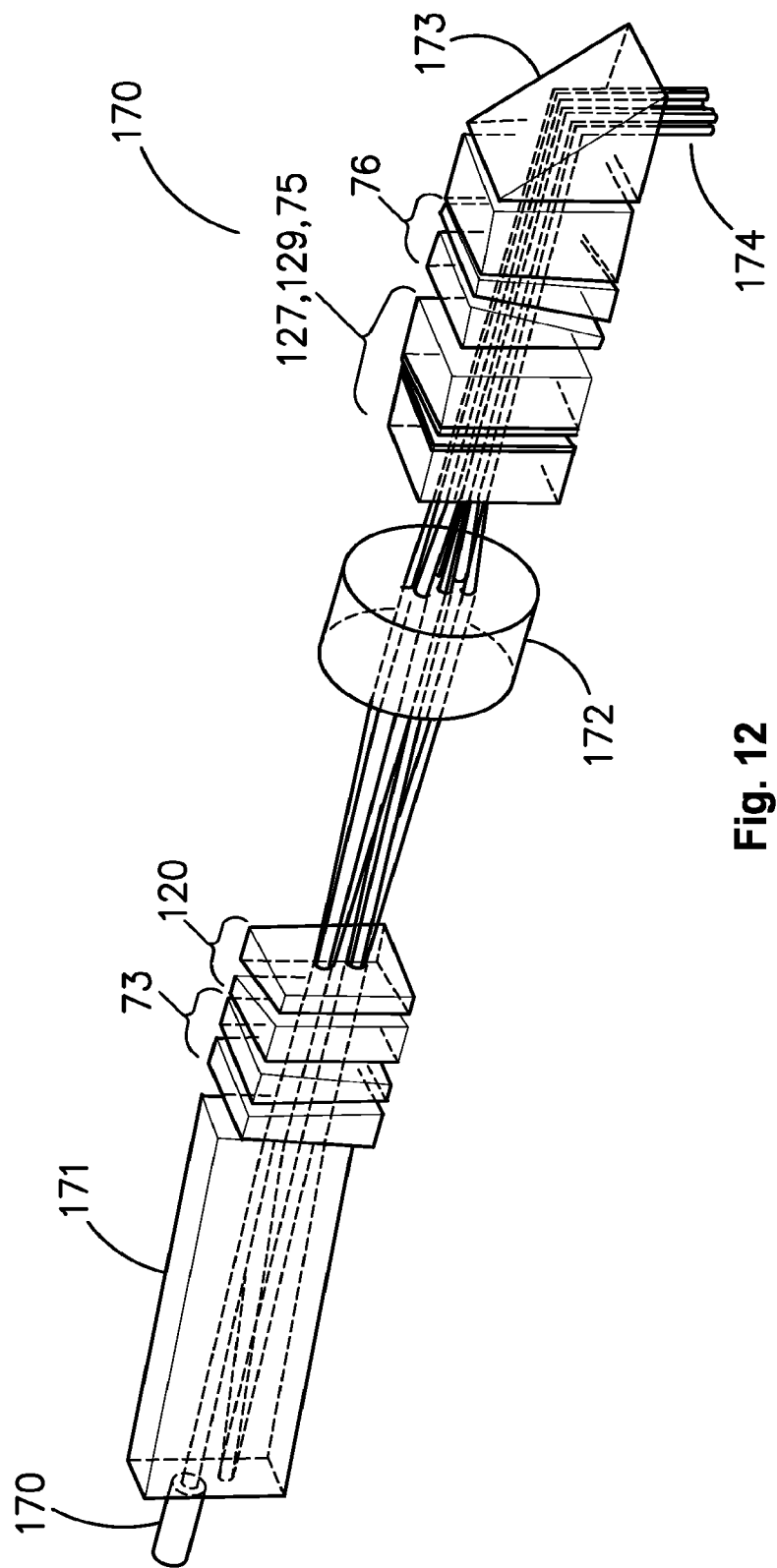
FIG. 12 illustrates an alternative prototype receiver.

FIG. 12 illustrates a simulated optical train implementation 170 of the embodiment including a delay line. In this arrangement, the input signal is input 170 into delay line block 171. The delay line block 171 implements the delay line 150 of FIG. 11 to produce a signal output and delay output. Next wedges 73 implement the polarization diversity unit of FIG. 7. This is followed by polarization splitter 120, focusing optics 172, polarisation alignment 127, 129 and Quarter Wave Plate 75. Additionally polarisation combiner 76 is utlised before the light is reflected via prism 173 onto a PiN array 174 for analysis.

Other modifications are possible. For example, where phase information only is to be detected, a polarization independent phase detector could be constructed through the substitution of the polarization separating wedge of FIG. 9 with a polarization walk off plate such that, at the focal plane of the lens, the orthogonal polarizations coalesce creating only 4 spots and polarization independence of the received power.

The embodiments can be utilized in many different forms for the monitoring of incoming signals. Where optical telecommunications are utilized, the information can be decoded. The embodiments can also be utilized in the measurement of signals derived from sampling of imaging systems or metrology systems.

Interpretation

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Although the present invention has been described with particular reference to certain preferred embodiments thereof, variations and modifications of the present invention can be effected within the spirit and scope of the following claims.

I claim:

1. A method of analysing an input optical signal, the method including the steps of:
   (a) dividing the input signal into first and second orthogonal signal polarisation components;
   (b) dividing a local oscillator signal having at least a first frequency into first and second orthogonal local polarisation components;
   (c) polarisation mixing the first signal polarisation component with the second local polarisation component to provide a first mixed signal, wherein the first signal polarisation component is orthogonal to the second local polarisation component;
   (d) polarisation mixing the second signal component with the first local polarisation component to provide a second mixed signal, wherein the second signal polarisation component is orthogonal to the first local polarisation component;
   (e) analysing the first and second mixed signals to determine optical power information of the first and second mixed signals at at least the first frequency.

2. A method as claimed in claim 1 wherein said input signal includes information encoded in a periodic signal.

3. A method as claimed in claim 1 wherein step (e) further includes the steps of:
   (e1) splitting the power of the first mixed signal into at least a first and second mixed sub-signals;
   (e2) delaying a first orthogonal polarisation component of the first mixed sub-signal relative to a second orthogonal polarisation component of the first mixed sub-signal by pi/2 radians to produce a phase delayed first sub-signal;

(e3) dividing the phase delayed first sub signal into orthogonal polarisation components and dividing the second mixed sub-signal into orthogonal polarisation components.

4. A method as claimed in claim 1 wherein said step (e) further includes the steps of:
(e1) delaying a first orthogonal polarisation component of the first mixed sub-signal relative to a second orthogonal polarization component of the first mixed sub-signal by pi/2 radians to produce a phase delayed first sub-signal;
(e2) dividing the phase delayed first sub signal into orthogonal polarisation components and dividing the second mixed sub-signal into orthogonal polarization components.

5. A method of analysing an input optical signal as claimed in claim 1 wherein, in step (d), phase information of each of the first and second orthogonal signal polarisation components is determined at the first frequency.

6. An apparatus for analysing an input signal, the apparatus including:
a polarisation diversity element interconnected to said input signal and a local oscillator signal having a first frequency for separating the optical power of the input signal into first and second orthogonal signal polarisation components and for separating the optical power of the oscillator signal into first and second orthogonal local polarisation components;
a first polarisation splitting element for further splitting the optical power of the first and second orthogonal signal polarisation components into further orthogonal sub-components;
a polarisation element for polarisation aligning predetermined ones of said subcomponents;
a polarisation translation element for spatially aligning groups of polarisation aligned sub-components to produce a series of spatially aligned subcomponents;
a second polarisation splitting element for splitting the optical power of the aligned subcomponents into output components having optical powers at at least the first frequency.

7. An apparatus for decoding polarization encoded input signals, the apparatus including:
a local oscillator outputting a local oscillating signal having a predetermined polarization state and a first frequency;
an input for inputting said polarization encoded input signal;
a polarisation diversity element interconnected to said input signal and local oscillating signal for separating the optical power of the input signal into first and second orthogonal signal polarisation components and for separating the optical power of the oscillator signal into first and second orthogonal local polarisation components;
a first polarisation splitting element for further splitting the optical power of the first and second orthogonal signal polarisation components into further orthogonal sub-components, and first and second orthogonal local polarisation components into further orthogonal sub-components;
a polarisation element for polarisation aligning predetermined ones of said sub-components;
a polarisation translation element for spatially aligning groups of polarisation aligned sub-components to produce a series of spatially aligned subcomponents;
a second polarisation splitting element for splitting the optical power of the aligned subcomponents into output components having optical powers at at least the first frequency.

* * * * *